Patented June 25, 1929.

1,718,285

UNITED STATES PATENT OFFICE.

ANTHONY GEORGE, OF NIAGARA FALLS, NEW YORK, ASSIGNOR TO THE MATHIESON ALKALI WORKS, INC., OF NEW YORK, N. Y., A CORPORATION OF VIRGINIA.

MANUFACTURE OF CALCIUM HYPOCHLORITE.

No Drawing.   Application filed August 4, 1926.   Serial No. 127,170.

This invention relates to improvements in the production of calcium hypochlorite. Calcium hypochlorite, that is $Ca(OCl)_2$, in pure form is relatively stable, but calcium chloride if present in substantial amount makes it relatively unstable. This is apparently due to the hygroscopic properties of calcium chloride. This invention provides an improved method of making calcium hypochlorite products of high purity, particularly with reference to contamination with calcium chloride, and which has several further important advantages.

It has long been known that both calcium chloride and calcium hypochlorite are produced when milk of lime is chlorinated and, likewise, that both sodium chloride and sodium hypochlorite are formed when solutions of caustic soda are chlorinated. Unlike calcium chloride, the presence of sodium chloride apparently does not adversely affect the stability of calcium hypochlorite.

Now I have discovered that when solutions or suspensions containing chemically equivalent amounts of caustic soda and lime are chlorinated substantially to completion only two products are obtained in substantial amount, namely, sodium chloride and calcium hypochlorite; and according to my present invention lime is chlorinated in the presence of caustic soda, or of sodium hypochlorite or mixtures of the two, to produce a calcium hypochlorite product relatively free from calcium chloride although it may contain salt. Calcium hypochlorite products so produced are very stable, for example, much more stable than bleaching powder or sodium hypochlorite solutions (I refer to solutions of sodium hypochlorite because this substance tends to decompose on removal of water). In place of caustic soda or sodium hypochlorite, corresponding compounds of other alkali metals are also useful in carrying out the invention.

In carrying out the invention, lime and caustic soda may be chlorinated together, advantageously in chemically equivalent amounts, or caustic soda may first be subjected to chlorination, lime then added, advantageously in amount chemically equivalent to the caustic soda originally present, and the resulting mixture chlorinated. The chlorination may be continued, for example, until there remains not more than about 1% of free alkali. The calcium hypochlorite product can be obtained either by evaporating the resulting solutions or suspensions to dryness or by separating precipitated calcium hypochlorite and drying the separated product. When caustic soda is subjected to a preliminary chlorination before lime is added and the mixture further chlorinated, it is advantageous to separate any sodium chloride precipitated during chlorination of the caustic soda before the addition of lime and further chlorination, particularly if the product is to be recovered by evaporation to dryness.

When lime and caustic soda are chlorinated together, the reaction proceeds with the formation of sodium chloride and calcium hypochlorite. Similarly, when sodium hypochlorite and lime are chlorinated together, the reaction proceeds with the formation of sodium chloride and calcium hypochlorite. In carrying out the invention by chlorination of caustic soda before the addition of lime, sodium hypochlorite is formed and this sodium hypochlorite, together with any remaining caustic soda, reacts with the lime when added and during subsequent chlorination to form sodium chloride and calcium hypochlorite.

The invention will be illustrated by the following example: 134 pounds of caustic soda and 131 pounds of high grade lime (95% $Ca(OH)_2$) are mixed with 686 pounds of water. This mixture is chlorinated, with agitation, until it contains about 1% or less of free alkali. About 233 pounds of chlorine are required. The slurry so formed may be treated in several ways to recover the calcium hypochlorite product. For example, this slurry may be evaporated to dryness with the production of a product containing about 47% to 48% of calcium hypochlorite together with a large amount of salt, that is sodium chloride. Or, the slurry may be filtered and the resulting cake dried either before or after pressing. Without pressing, a calcium hypochlorite product containing about 70% of calcium hypochlorite can be so produced. With thorough pressing, say with pressures of from 1,000 to 5,000 pounds per square inch, a product containing as much as 87% or more of calcium hypochlorite can be so produced.

Where the calcium hypochlorite product is recovered from the slurry, as by filtration, leaving a mother liquor, the separated liquor or filtrate may be treated with lime to precipitate a basic calcium hypochlorite which may with advantage be used for making up the mixture to be chlorinated in the next cycle of the operation. In carrying out the operation in this way, allowance must be made for lime, water and chlorine so returned to the process. Where the calcium hypochlorite product is recovered by evaporating the chlorinated slurry to dryness it is advantageous to use as little water as possible with the particular type of agitation employed, while where the calcium hypochlorite product is separated from the chlorinated slurry as by filtration it is advantageous to use sufficient water to keep all of the sodium chloride present, or a substantial part of it, in solution.

The invention will be further illustrated by the following example: 55 pounds of caustic soda are dissolved in 65.3 pounds of water, and this solution is chlorinated until only about 6% of the caustic soda added remains unchlorinated. Precipitated salt is separated, for example by decantation. Any sodium hypochlorite remaining in salt so separated may be recovered by washing the separated salt with water and using the wash water in a subsequent chlorination of caustic soda. This sodium hypochlorite solution may, for example, comprise about 29% of sodium hypochlorite, 7.5% of sodium chloride, 1.5% of sodium hydroxide and 62% water. 100 pounds of the sodium hypochlorite solution are diluted with 82 pounds of water and 32 pounds of high grade lime (95% $Ca(OH)_2$) are added. This slurry is then chlorinated, with agitation, until less than about 1% of free alkali remains. About 30 pounds of chlorine are required. The chlorinated slurry may be evaporated to dryness to produce a calcium hypochlorite product which may, for example, contain about 63% of calcium hypochlorite.

To produce a slurry containing in the solid phase only calcium hypochlorite in this mode of operation, it is advantageous to modify the procedure somewhat. The chlorination of caustic soda may be carried out exactly as has just been described, but if lime and chlorine are added to the resulting solution in the maximum amounts possible before precipitation of sodium chloride ensues the slurry formed is very stiff and difficult if not impossible to agitate. In this way of carrying out the invention, I find it advantageous to add all of the water necessary for dilution to permit adequate agitation to a portion of the sodium hypochlorite solution such that only half of the total yield of calcium hypochlorite is obtained when all of the sodium hypochlorite in this portion has been acted upon after the addition of lime and chlorine, to filter off calcium hypochlorite so produced, or otherwise separate it, to add the liquor from which the calcium hypochlorite has been separated to the remainder of the sodium hypochlorite solution, and to add lime and chlorine to this mixture to recover the balance of the yield of calcium hypochlorite.

For example, 100 pounds of the sodium hypochlorite solution just described may be treated as follows: 58 pounds of water are added to somewhat more than half of the sodium hypochlorite solution together with about an equal proportion of 32 pounds of lime, and this mixture is chlorinated. The calcium hypochlorite precipitated is separated from the solution, the separated solution is mixed with the balance of the sodium hypochlorite solution, the balance of the 32 pounds of lime is added, and this mixture is chlorinated. The calcium hypochlorite precipitated is separated and combined with that recovered in the first operation. A total of about 30 pounds of chlorine is required. The solution remaining after the last separation of calcium hypochlorite may be treated with lime, as has been described, to recover any available chlorine in the form of a precipitated basic calcium hypochlorite which may be used in the next cycle of the operation in place of an equivalent amount of lime, in which case somewhat more water is usually required to prevent the precipitation of salt.

When, in carrying out the invention, caustic soda is subjected to a preliminary chlorination before lime is added and the mixture further chlorinated, it is advantageous to continue the chlorination of the caustic soda up to the point at which solid sodium hypochlorite just begins to separate. At this point, considerable salt is precipitated from which the sodium hypochlorite solution may be separated, for example by decantation or filtration. The proportion of calcium hypochlorite in the resulting product may thus be somewhat increased. This mode of operation is particularly advantageous where the subsequent chlorination with the addition of lime is carried out to produce slurries in which all sodium chloride present is in solution.

I claim:

1. A process of making calcium hypochlorite which comprises chlorinating lime in the presence of water and of an alkali metal compound reacting with lime in the presence of chlorine to form calcium hypochlorite and a chloride of the alkali metal.

2. A process of making calcium hypochlorite which comprises chlorinating milk of lime containing an alkali metal hydroxide in amount approximately equivalent to the lime present.

3. A process of making calcium hypochlorite which comprises chlorinating a solution of an alkali metal hydroxide, adding lime in amount approximately equivalent to the alkali metal hydroxide originally present, and continuing the chlorination.

4. A process of making calcium hypochlorite which comprises chlorinating milk of lime containing caustic soda in amount approximately equivalent to the lime present.

5. A process of making calcium hypochlorite which comprises chlorinating milk of lime containing caustic soda in amount approximately equivalent to the lime present substantially to completion and evaporating the chlorinated mixture to dryness.

6. A process of making calcium hypochlorite which comprises chlorinating milk of lime containing caustic soda in amount approximately equivalent to the lime present substantially to completion and separating precipitated calcium hypochlorite from the resulting mixture.

7. A process of making calcium hypochlorite which comprises chlorinating a solution of caustic soda, adding lime in amount approximately equivalent to the caustic soda originally present, and continuing the chlorination.

8. A process of making calcium hypochlorite which comprises chlorinating a solution of caustic soda, separating precipitated sodium chloride, adding lime to the resulting solution in amount approximately equivalent to the caustic soda originally present, and continuing the chlorination.

9. A process of making calcium hypochlorite which comprises chlorinating a solution of caustic soda, adding lime in amount approximately equivalent to the caustic soda originally present, continuing the chlorination substantially to completion, and separating precipitated calcium hypochlorite from the resulting mixture.

10. A process of making calcium hypochlorite which comprises chlorinating a solution of caustic soda, diluting a portion of the solution, adding lime to the diluted portion chlorinating the diluted portion with added lime substantially to completion and separating precipitated calcium hypochlorite, combining the solution remaining after separation of this calcium hypochlorite with the remaining portion of the chlorinated solution of caustic soda, adding lime to the combined solution, chlorinating the combined solution substantially to completion, and again separating precipitated calcium hypochlorite.

In testimony whereof I affix my signature.

ANTHONY GEORGE.